United States Patent [19]
Shoji et al.

[11] Patent Number: 5,830,834
[45] Date of Patent: Nov. 3, 1998

[54] AMMONIUM CARBOXYLATE TYPE FLUORINE-CONTAINING COMPOUND, SOLID SURFACE MODIFIER CONTAINING THE SAME AND MAGNETIC RECORDING MEDIUM USING THE SAME

[75] Inventors: Mitsuyoshi Shoji, Ibaraki-ken; Takayuki Nakakawaji, Hitachi; Hiroshi Sasaki, Ibaraki-ken; Yutaka Ito, Takahagi; Shigeki Komatsuzaki, Mito; Hiroyuki Matsumoto, Ebina, all of Japan

[73] Assignee: Hitachi, Ltd., Tokyo, Japan

[21] Appl. No.: 620,710

[22] Filed: Mar. 21, 1996

Related U.S. Application Data

[62] Division of Ser. No. 381,277, Jan. 31, 1995, Pat. No. 5,536,578, which is a continuation of Ser. No. 972,816, Nov. 6, 1992, abandoned.

[30] Foreign Application Priority Data

Nov. 7, 1991 [JP] Japan ..................................... 3-318645

[51] Int. Cl.$^6$ ................................................. C10M 131/00
[52] U.S. Cl. ..................... 508/504; 508/508; 106/287.27
[58] Field of Search ......................... 252/62.54; 508/517, 508/504, 508, 509; 106/287.27

[56] References Cited

U.S. PATENT DOCUMENTS

| | | | |
|---|---|---|---|
| 4,836,944 | 6/1989 | Tohzuka et al. | 508/517 |
| 5,091,269 | 2/1992 | Kondo et al. | 428/695 |
| 5,128,216 | 7/1992 | Ng | 428/695 |
| 5,456,980 | 10/1995 | Murakami et al. | 428/336 |
| 5,536,578 | 7/1996 | Shoji et al. | 428/408 |

Primary Examiner—Prince Willis, Jr.
Assistant Examiner—Cephia D. Toomer
Attorney, Agent, or Firm—Antonelli, Terry, Stout & Kraus, LLP.

[57] ABSTRACT

A magnetic recording medium is produced by coating a body having (a) a non-magnetic substrate, (b) at least one magnetic substance layer formed on the non-magnetic substrate and (c) at least one protective layer formed on the magnetic substance layer which contains at least one member selected from the group consisting of inorganic oxides, graphite and amorphous allotropes of carbon, with a solid surface modifier containing (i) an ammonium carboxylate type fluorine-containing compound having the formula, $$(R_f\text{—COO}^-\text{H}^+)_n\text{—R,}$$

wherein $R_f$ is a perfluoropolyoxyalkyl chain having a number average molecular weight of at least 800, n is a number of 1–2, and R is a residue selected from the group consisting of an aromatic ammonium which may have one or more substituents at the nucleus, benzylammonium which may have one or more substituents at the nucleus, dibenzylammonium which may have one or more substituents at the nucleus, tribenzylammonium which may have one or more substituents at the nucleus and an aromatic inium which may have one or more substituents at the nucleus, and (ii) an alcohol or fluorine-containing solvent and optionally water, on the surface of the protective layer (c), to form a coat, and then removing the solvent, or alcohol and water from the coat.

7 Claims, 4 Drawing Sheets

AMMONIUM CARBOXYLATE TYPE FLUORINE-CONTAINING COMPOUND, SOLID SURFACE MODIFIER CONTAINING THE SAME AND MAGNETIC RECORDING MEDIUM USING THE SAME

This application is a Divisional application of application Ser. No. 381,277, filed Jan. 31, 1995, now U.S. Pat. No. 5,536,578, which application is a Continuation application of application Ser. No. 972,816, filed Nov. 6, 1992 now abandoned.

FIELD OF THE INVENTION

The present invention relates to an ammonium carboxylate type fluorine-containing compound, a surface modifier for improving the hydrophobic property, oilphobic property and lubricity of solid surfaces, and a magnetic recording medium using the same. Particularly, it relates to the improvement of the sliding durability of a magnetic recording medium having a carbon protective film as the outermost layer.

DESCRIPTION OF RELATED ART

For various types of solid materials, there have been proposed many methods for preventing the contamination on the surface of the solid materials or for imparting hydrophobic property or oilphobic property to the surface of the solid materials. Commonly used among them is a method of surface modification which comprises coating on the surface of a solid material a chemically inactive, fluorine-containing surfactant that has a low surface energy. The fluorine-containing surfactant referred to herein is a perfluoroalkyl type compound represented by the formula,

$$C_aF_{2a+1}\text{-}P.$$

It is used after dissolved in various organic solvents.

In the above formula, a is 3 to 12 and P is a polar group of various types including —SO$_2$K, —SO$_2$Na, —SO$_2$F, —COOH, —SO$_3$H, —OH and the like, as described in JP-A-61-42727, JP-A-58-29147 and JP-A-2-145550. All the perfluoroalkyl type compounds disclosed in the documents, however, have a short fluorocarbon chain with a carbon number (a) of 3 to 12. Consequently, the compounds are poor in effectiveness when used for modifying the lubricity of the friction surface of a solid material, although they are highly effective in preventing the contamination on the surface of a solid material and in imparting hydrophobic property and oilphobic property to the surface of a solid material.

Therefore, in order to modifying the surface of a solid material so as to have an improve lubricity, a perfluoropolyoxyalkyl type lubricant with a long fluorocarbon chain represented by the formula,

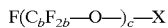

$$F(C_bF_{2b}\text{—}O\text{—})_c\text{—}X$$

are generally in use.

In this case, the carbon number is as large as 30 to 120, and the modified surface has a good lubricity. This type of modification methods include, for example, (1) surface modification by the use of a perfluoropolyoxyalkyl type lubricant that is adsorbed on the surface merely through the van der Waals force (U.S. Pat. No. 3,490,946 and U.S. Pat. No. 3,778,308), (2) surface modification by the use of a perfluoropolyoxyalkyl or perfluoropolyoxyalkylene type lubricant which contains in the molecular terminal a heterocyclic ring or a polar group such as amide and ester as a functional group having a high adsorbability (JP-A-61-10368, JP-A-60-34924, JP-A-61-4727 and JP-A-61-155345), and (3) surface modification by the use of a lubricant having as a functional group a silane coupling group that reacts with the surface and fixes itself thereto (JP-A-63-225918 and JP-A-64-56688).

One of the disadvantages of these surface modifiers containing a perfluoropolyoxyalkyl or perfluoropolyoxyalkylene type lubricant with a long fluorocarbon chain is that solvents other than fluorine containing ones cannot be used as the solvent. Although fluorine-containing solvents are advantageous in their low toxicity and non-flammability or high fire resistance, they are disadvantageously expensive.

On the other hand, magnetic recording media are being used in wide fields for information memory playback apparatuses of large capacity. For the use wherein a particularly high recording density is required, thin layer magnetic recording media with a high magnetic recording density are used. Among magnetic recording apparatuses, magnetic disk apparatuses are required to have a particularly high recording density and a high-speed data uptake. For such magnetic disk apparatuses, the gap between the head and the disk is narrowed and subsequently the probability of causing contact sliding is raised by the increase of memory capacity. The trend makes severe the conditions under which thin layer magnetic recording media are used. Therefore, the improvement of sliding durability thereof is an indispensable factor. When a protective film is formed by vapor deposition or sputtering as the outermost layer of the media, lubricants are difficultly fixed to the surface of the protective film by adsorption or by chemical reaction. Particularly when the protective film is a film containing a chemically stable carbon allotrope, fixing lubricants to the surface is more difficult. Due to this, lubricants are apt to detach from the surface of the protective layer and hence a sufficient sliding durability cannot be obtained. When an inorganic oxide film is formed, on the other hand, as the protective layer, fluorine-containing lubricants cover the surface thereof in an undesirably low rate. This is because the surface of inorganic oxide film is hydrophilic whereas the fluorine-containing lubricants have hydrophobic property.

As mentioned above, the known methods of surface modification that improve the sliding durability of a magnetic recording medium are classified into two types. One uses a lubricant containing a compound having perfluoroalkyl of short fluorocarbon chain. The other uses a lubricant containing a compound having perfluoropolyoxyalkyl or perfluoropolyoxyalkylene of long fluorocarbon chain.

The lubricity obtained by the use of a compound having perfluoroalkyl of short fluorocarbon chain is lower than the lubricity obtained by the use of a compound having a long fluorocarbon chain. However, by virtue of its good solubility in organic solvents, the compound having perfluoroalkyl of short fluorocarbon chain is used incorporated into the binder layers of magnetic tapes and coating-type magnetic disks. The methods of surface modification of this type have been proposed in a large number. A recent proposal (JP-A-64-9961) teaches that surface treatment with a fluorine surface modifier containing a compound having as a functional group an ammonium perfluoroalkylcarboxylate of 3–12 carbon atoms of the formula,

$$R_f\text{—COO}^-\text{N}^+\text{H}_3\text{—R},$$

wherein R is hydrogen or a hydrocarbon group having a hydroxy group, is effective. It also teaches that a magnetic recording medium subjected to such surface treatment has an improved sliding properties. However, since the ammonium perfluoroalkylcarboxylate compound has a short fluorocarbon chain, it can hardly be applied to a thin layer magnetic medium, which is used under severe sliding conditions to attain a high recording density.

On the other hand, lubricants containing a compound having a perfluoropolyoxyalkyl of long fluorocarbon chain or a perfluoropolyoxyalkylene of long fluorocarbon chain are utterly insoluble in nonfluorine-containing organic solvents. Therefore, disadvantageously, they cannot be used incorporated in a coating material. They are coated on a solid surface, and many patent proposals have been made for their use in magnetic recording media. Of the proposals, there is a method of surface modification wherein a compound having perfluoropolyoxyalkyl contained in a lubricant is chemically fixed to the surface of a magnetic disk (U.S. Pat. No. 4,120,995). Although the proposed lubricant shows a good lubricating property due to their long fluorocarbon chain, the lubricity is lost once the compound is detached from the surface by collision between the head and the disk. In recognition of the situation, lubricants are desired to have a self-recovering property such that the lubricant detached from the sliding surface can return again to the sliding surface. For this purpose, lubricants which have an appropriate adsorbability are required. When the surface is covered with a protective film formed by vapor deposition or sputtering, the lubricant can be poorly adsorbed on the surface. Particularly when the protective film contains carbon allotropes, the adsorbability of the lubricant is further reduced due to the chemical stability of the carbon allotropes contained in the film. Accordingly, conventionally in practical use, the surface of a protective film has been pretreated in order to enhance the adsorbability of the lubricant. When the protective film is an oxide film formed by vapor deposition or sputtering, the oxide film has a good adsorbability for lubricants. However, the film also has a strong affinity to water. Therefore, undesirably, penetration of water into the interface between the lubricant and the inorganic oxide results in unsatisfactory formation of a hydrophobic surface. In other words, the rate of surface covering by the lubricant is poor. Furthermore, the use of fluorine-containing solvents is inevitable due to the insolubility of lubricants containing a segment having perfluoropolyoxyalkyl of long fluorocarbon chain or perfluoropolyoxyalkylene of long fluorocarbon chain in organic solvents. It disadvantageously makes the surface modification process costly and makes difficult the waste liquid disposal.

SUMMARY OF THE INVENTION

The objects of the present invention are to provide a novel fluorine-containing compound that can overcome the disadvantages of the prior art discussed above; to provide a surface modifier containing the compound which can impart a high hydrophobic property and oilphobic property, and in particular a high lubricity to the surface of a solid; and to provide a magnetic recording medium having an improved sliding durability.

According to the present invention, there are provided:
[1] an ammonium carboxylate type fluorine-containing compound which has the formula, $(R_f\text{—COO}^-\text{H}^+)_n\text{—R}$ (A), wherein $R_f$ is a perfluoropolyoxyalkyl chain having a number average molecular weight of at least 800, n is a number of 1–2, and R is a residue selected from the group consisting of an aromatic ammonium which may have one or more substituents at the nucleus, benzylammonium which may have one or more substituents at the nucleus, dibenzylammonium which may have one or more substituents at the nucleus, tribenzylammonium which may have one or more substituents at the nucleus and an aromatic inium which may have one or more substituents at the nucleus;

[2] a solid surface modifier which comprises
(i) an ammonium carboxylate type fluorine-containing compound having the formula, $(R_f\text{—COO}^-\text{H}^+)_n\text{—R}$ (A)

wherein $R_f$, n and R are as defined above,
(ii) at least one solvent selected from the group consisting of alcohols, fluorine-containing solvents and a mixture of at least one alcohol and water, provided that when the mixture of at least one alcohol and water is selected, the weight ratio of the alcohol(s) to water is 10:90 inclusive to 100:0 exclusive;

[3] a magnetic recording medium which comprises
(a) a non-magnetic substrate,
(b) at least one magnetic substance layer formed on the non-magnetic substrate,
(c) a protective layer formed on the magnetic substance layer which comprises at least one member selected from the group consisting of inorganic oxides, graphite and amorphous allotropes of carbon, and
(d) a layer formed of the protective layer which comprises an ammonium carboxylate type fluorine-containing compound having the formula, $(R_f\text{—COO}^-\text{H}^+)_n\text{—R}$ (A), wherein $R_f$, n and R are as defined above;

[4] a process for modifying solid surfaces which comprises the steps of:
(1) coating a solid surface modifier comprising
(i) an ammonium carboxylate type fluorine-containing compound having the formula, $(R_f\text{—COO}^-\text{H}^+)_n\text{—R}$ (A), wherein $R_f$, n and R are as defined above, and
(ii) at least one solvent selected from the group consisting of alcohols, fluorine-containing solvents and a mixture of at least one alcohol and water, provided that when the mixture of at least one alcohol and water is selected, the weight ratio of the alcohol to water is 10:90 inclusive to 100:0 exclusive, on the surface of a solid comprising at least one member selected from the group consisting of inorganic oxides, graphite and amorphous allotropes of carbon, to form a coat, and
(2) removing the solvent from the coat; and

[5] a process for producing a magnetic recording medium which comprises the steps of
(1) coating a body comprising
(a) a non-magnetic substrate,
(b) at least one magnetic substance layer formed on the non-magnetic substrate, and
(c) a protective layer formed on the magnetic substance layer which comprises at least one member selected from the group consisting of inorganic oxides, graphite and amorphous allotropes of carbon, with a solid surface modifier comprising
(i) an ammonium carboxylate type fluorine-containing compound having the formula, $(R_f\text{—COO}^-H^+)_n\text{—R}$ (A), wherein $R_f$, n and R are as defined above, and
(ii) at least one solvent selected from the group consisting of alcohols, fluorine-containing solvents and a mixture of at least one alcohol and water, provided that when the mixture of at least one alcohol and water is selected, the weight ratio of the alcohol to water is 10:90 inclusive to 100:0 exclusive, to form a coat, and
(2) removing the solvent from the coat.

DETAILED DESCRIPTION OF THE INVENTION

Figure 1A:
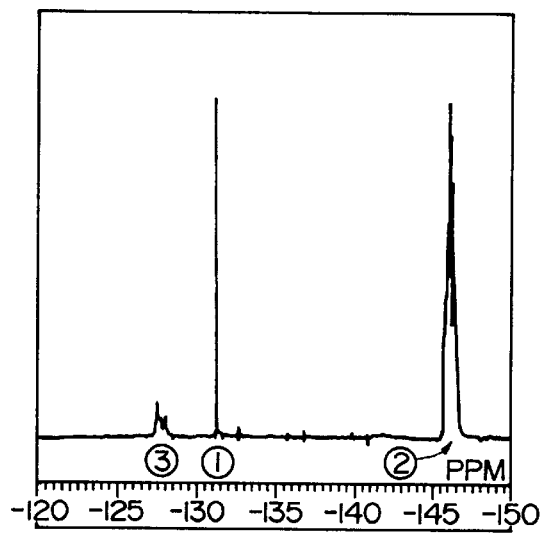
FIGS. 1A and 1B show NMR spectra of the fluorine-containing compound of Example 1 of the present invention, FIG. 1A referring to the $^{19}$F-NMR spectrum and FIG. 1B referring to the $^1$H-NMR system.

According to the present invention, the above-mentioned objects have been attained by using the compound of the formula (A) which contains (i) an ammonium carboxylate residue having at least one aromatic ring or at least one nitrogen-containing heterocyclic ring and (ii) one or more perfluoropoly-oxyalkyl or perfluoropolyocyalkylene chains, wherein the residue (i) is bonded to one or more molecular ends of the residue (ii) so that the compound (A) has a chemical structure that enables easy adsorption on the surface of a solid, by inventing a water-soluble surface treating agent containing the compound, and further by completing a magnetic recording medium using the surface treating agent.

The above-mentioned magnetic recording medium includes a non-magnetic substrate, one or more magnetic layers formed on the substrate, a protective film formed on the magnetic layer(s), and a fluorine-containing layer containing the surface treating agent containing the compound of the present invention provided on the protective layer.

According to the present invention, a fluorine-containing film with a high hydrophobic property, oilphobic property and lubricity can be formed as follows. The compound of the formula (A), which has a structure wherein the residue (i) an ammonium carboxylate residue having at least one aromatic ring or at least one nitrogen-containing heterocyclic ring is bonded to one or more molecular ends of the residue (ii) one or more perfluoropolyoxyalkyl or perfluoropolyoxyalkylene chains, is dissolved in an aqueous solution containing an alcohol (e.g. methanol and ethanol). The alcohol solution is coated on the surface to be treated and then the solvent is removed, for example by drying. As the solvent, there may be used an alcohol (e.g. methanol and ethanol) alone or, alternatively, a fluorine-containing solvent alone. Thus, the respective solvents can be used properly according to the intended uses. Also the solvent used may be a mixture of at least one alcohol and water. In this case, the content of water may be freely selected within the range of from 0% by weight exclusive to 95% by weight inclusive.

Specific examples of the perfluoropolyoxyalkyl and perfluoropolyoxyalkylene chains referred to in the present invention includes the chains contained in the Krytox series polymers (available from E. I. du Pont de Nemours Co.). The Krytox resins polymers have a perfluoropolyoxypropylene chain represented by the following formula, $-(CF(CF_3)-CF_2-O-)_d-CF(CF_3)-$, wherein d is an integer of 1 or more. Of course, the chains are not limited thereto.

Specific examples of a mixed system of perfluoropolyoxypropyl and perfluoropolyoxyethylene include the chains contained in the Fomblin Z series polymers manufactured by Monte Fluos Corp. The Fomblin Z series polymers have the chain represented by the following formula, $-CF_2-(CF_2-CF_2-O-)_e-(-CF_2-O-)_f-CF_2-$, wherein e and f are each an integer of 1 or more. Of course, the chains are not limited thereto.

Specific examples of perfluoropolyoxypropyl include the chains contained in the Demnam series polymers manufactured by Daikin Industries Ltd. The Demnam series polymers have the chain represented by the following formula, $F(CF_2-CF_2-CF_2-O)_g-CF_2-CF_2-$ wherein g is an integer of 1 or more. Of course, the chains are not limited thereto.

When the molecular weight is too small the lubricity is insufficient. A practically useful range of molecular weight is at least 800, preferably between 800 inclusive and 10,000 inclusive.

The ammonium carboxylate type fluorine-containing compound of the present invention is a compound having the formula, $(R_f\text{—COO}^-H^+)_n\text{—R}$ (A), wherein $R_f$ is a perfluoropolyoxyalkyl chain having a number average molecular weight of at least 800, n is a number of 1–2, and R is a residue selected from the group consisting of an aromatic ammonium which may have one or two substituents at the nucleus, benzylammonium which may have one or more substituents at the nucleus, dibenzylammonium which may have one or more substituents at the nucleus, tribenzylammonium which may have one or more substituents at the nucleus and an aromatic inium which may have one or more substituents at the nucleus.

Preferably, the compound is an ammonium carboxylate type fluorine-containing compound of the formula,

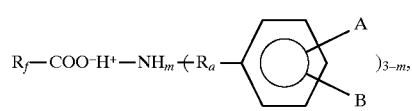

wherein $R_f$ is a perfluoropolyoxyalkyl chain having a number average molecular weight of at least 800, n is a number of 0–2, $R_a$ is a direct single bond or methylene group, and A and B are independently hydrogen, methoxy, nitro, halogeno, $C_{1-18}$ alkyl, phenoxy or benzyl.

$R_f$ is preferably a perfluoropolyoxyalkyl chain of a number average molecular weight falling within the range of from 800 inclusive to 10,000 inclusive. More preferably, it is a perfluoropolyoxyalkyl chain having the repeating unit:

—CF$_2$—CF$_2$—CF$_2$—O—

R is preferably a residue selected from the group consisting of:

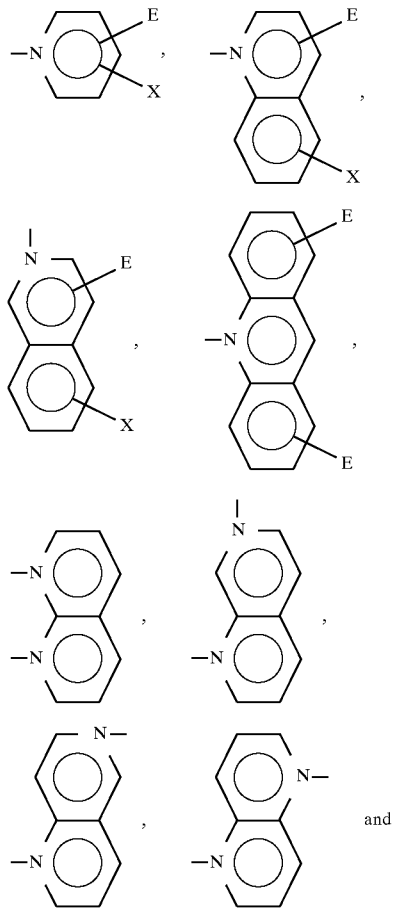

and

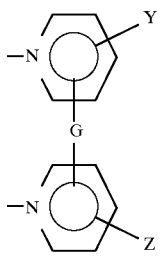

wherein E and X are independently a residue selected from the group consisting of hydrogen, C$_1$–C$_{18}$ alkyl, hydroxy, methoxy, nitro, cyano and halogeno, G is a bond selected from the group consisting of a direct single bond, —NH—, —S—, —SS—, —CH$_2$CH$_2$—, —CO— and >C(=N—OH), and Y and Z are independently a residue selected from the group consisting of hydrogen, C$_1$–C$_{18}$ alkyl, —COOH, —COOCH$_3$, and —CH$_2$OH. More preferably, R denotes phenylammonium, diphenylammonium, triphenylammonium, benzylammonium, dibenzylammonium, tribenzylammonium, pyridinium, qunolinium, isoquinolinium, acridinium, naphthyridinium, 4,4'-bipyridinium, 2,2'-bipyridinium, or bipyridinium bridged by —CO—; or one of the said groups having at the aromatic nucleus one or two substituents selected from methoxy, C$_1$–C$_{18}$ alkyl, halogeno, nitro, benzyl and phenoxy, provided that when the aromatic nucleus is substituted with two substituents, the substituents may be the same or different. Still more preferably, it denotes phenylammonium, benzylammonium, pyridinium, quinolinium or acridinium, or the above-mentioned groups having at the aromatic nucleus one or two substituents selected from methoxy, C$_1$–C$_{18}$ alkyl, halogeno, nitro, benzyl and phenoxy, provided that when the aromatic nucleus is substituted with two substituents, the substituents may be the same or different.

Specific examples of the structural formula of the ammonium carboxylate type compound of the present invention are shown below.

[Formula 3]

F(CF(CF$_3$)—CF$_2$—O)$_d$—CF(CF$_3$)—COO$^-$H$^+$NH$_2$—C$_6$H$_5$

[Formula 4]

F(CF(CF$_3$)—CF$_2$—O)$_d$—CF(CF$_3$)—COO$^-$H$^+$NH(H)—C$_6$H$_3$(OCH$_3$)(NO$_2$)

[Formula 5]

F(CF(CF$_3$)—CF$_2$—O)$_d$—CF(CF$_3$)—COO$^-$H$^+$NH$_2$CH$_2$—C$_6$H$_5$

-continued
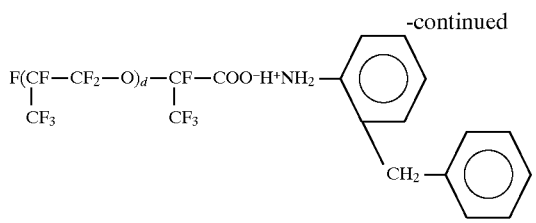
[Formula 6]
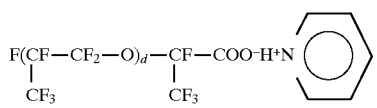
[Formula 7]
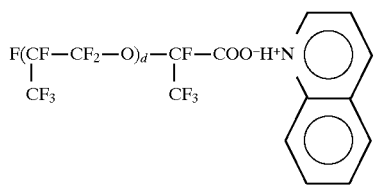
[Formula 8]
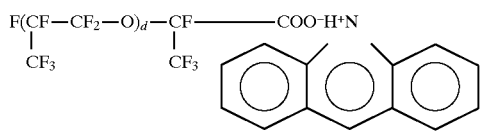
[Formula 9]
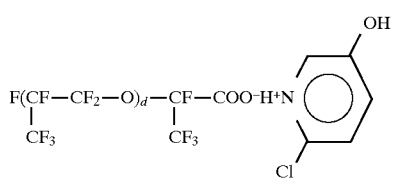
[Formula 10]
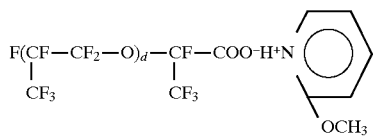
[Formula 11]
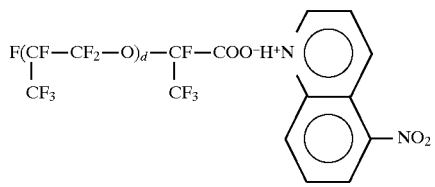
[Formula 12]
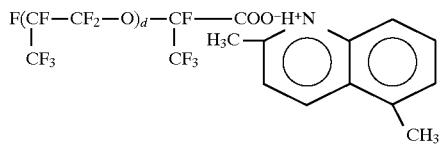
[Formula 13]
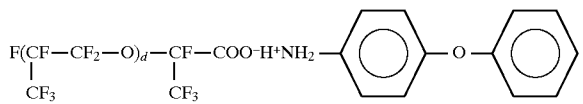
[Formula 14]
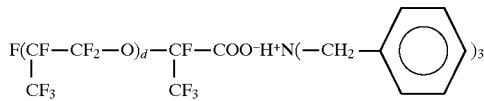
[Formula 15]
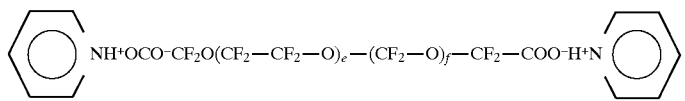
[Formual 16]

-continued
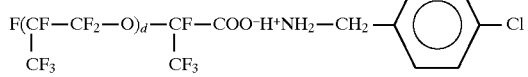
[Formula 17]
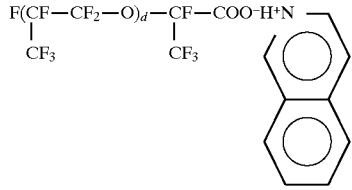
[Formula 18]
wherein d is 4–60 and e = f is 4–60.
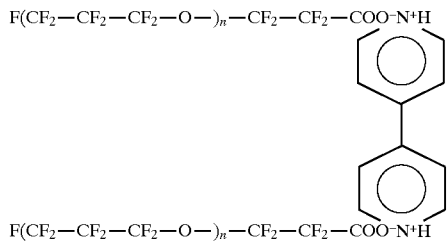
[Formula 19]
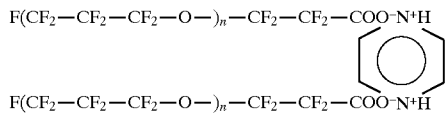
[Formula 20]
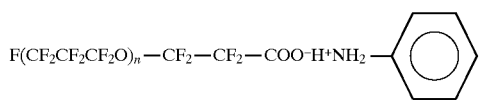
[Formula 21]
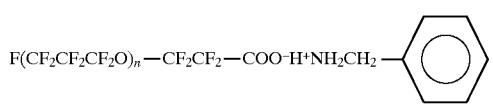
[Formula 22]
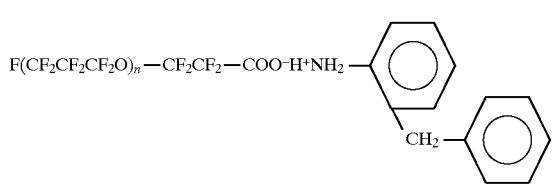
[Formula 23]
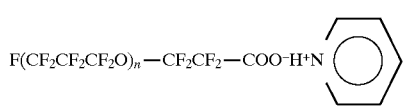
[Formula 24]
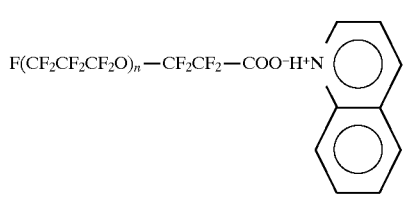
[Formula 25]
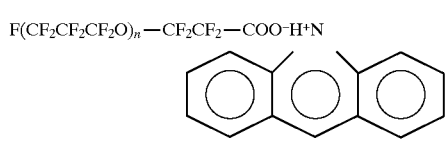
[Formula 26]

-continued
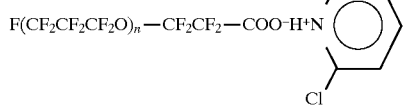
[Formula 27]
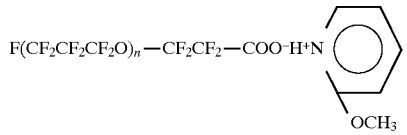
[Formula 28]
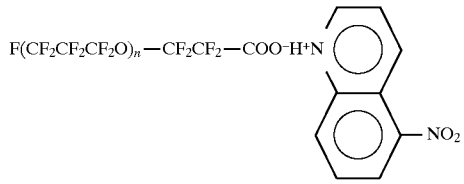
[Formula 29]
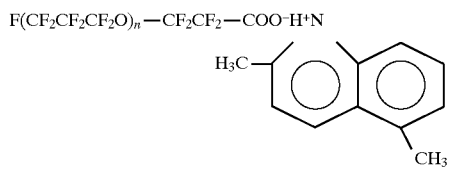
[Formula 30]
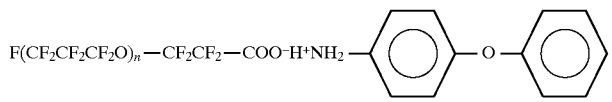
[Formula 31]
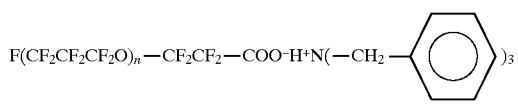
[Formula 32]
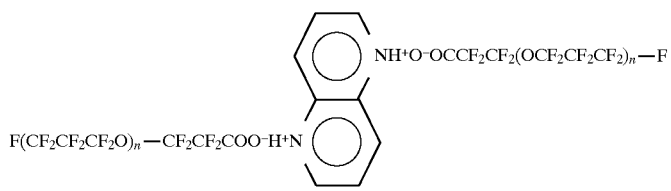
[Formula 33]
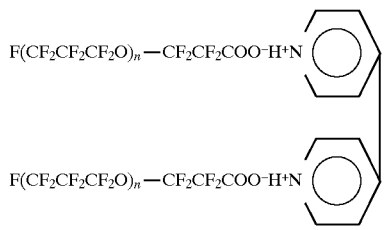
[Formula 34]
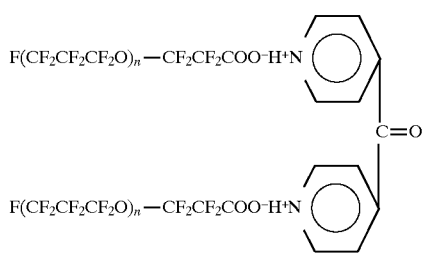
[Formula 35]

-continued

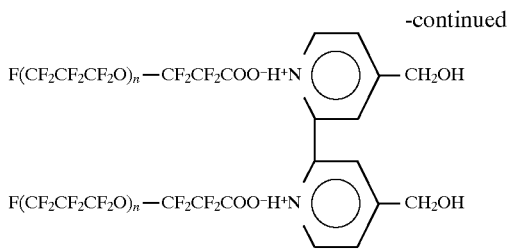

wherein d is 4–60.

The ammonium carboxylate group in the surface modifier of the present invention is strongly polarized. Therefore, the modifier is strongly adsorbed to the adsorption site (e.g. hydroxy group etc.) on the surface of a solid to which it is adsorbed. At the same time, the aromatic ring attached to the ammonium carboxylate group or the nitrogen-containing hetero-ring with aromaticity shows a strong affinity to the carbon in the protective film. Therefore, the modifier is strongly adsorbed on the protective film of a magnetic recording medium when the protective film contains carbon. Also, the perfluoropolyoxyalkyl or perfluoropolyoxyalkylene chain as a lubricating segment and the aromatic ring attached to the ammonium carboxylate group or the nitrogen-containing hetero-ring with aromaticity are hydrophobic. Therefore, water can hardly penetrate into the neighborhood of the ammonium carboxylate groups. As a result, the oxide film, when used as a protective layer, can be kept sufficiently hydrophobic.

The surface of the body which has been modified with the above-mentioned surface modifying material containing the fluorine-containing compound is covered with perfluoropolyoxyalkylene film. It exhibits a sufficient hydrophobic property, oilphobic property and lubricity over a long period of time. This advantage is satisfactorily obtained either for a film containing carbon and an oxide film when they are used as the protective film of a magnetic recording medium. Moreover, the surface-modification exerts, besides the effect of enhancing hydrophobic property, oilphobic property and lubricity, also a corrosion preventive effect. The corrosion preventive effect brings a bonus effect on a magnetic recording medium, which tends to be damaged by corrosion. Accordingly, magnetic storage devices provided with the magnetic recording medium of the present invention can be expected to have a high sliding durability, corrosion resistance and hence enhanced reliability.

DESCRIPTION OF THE PREFERRED EMBODIMENTS

The present invention will be described in more detail below with reference to Examples, but it is in no way limited thereto.

EXAMPLE 1

In 50 g of trifluorotrichloroethane was dissolved 15.4 g (0.008 mol) of Krytox 157 FS-L (mfd. by E. I. du Pont de Nemours Co., number average molecular weight: 1,920) represented by the following formula,

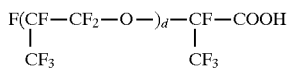

wherein d is average 14, and stirred throughly. To the solution was added dropwise a solution of 2.5 g of p-phenoxyaniline in 70 g of methanol, and thorough stirring was continued at room temperature for 1 hour.

[Formula 36]

After the reaction, trifluorotrichloroethane and methanol were removed by means of an evaporator to obtain about 17 g of a brown solid. The brown solid was dissolved in 200 g of perfluorohexane to obtain a solution (I).

Then, the solution (I) and 100 g of methanol were placed in a 500-ml separatory funnel, then thoroughly stirred and allowed to stand for 1 hour. After standing, the solution in the separatory funnel separated into two layers, and a solution (II) was obtained from the lower layer. The solution (II) was placed in an evaporator and the solvent (perfluorohexane) was removed, whereby about 15 g of a pale brown, highly viscous liquid fluorine-containing compound having the structure of the formula 14 shown before was obtained. The compound had a viscosity of $169 \times 10^5$ $m^2/s$ at 40° C.

Figure 1B:
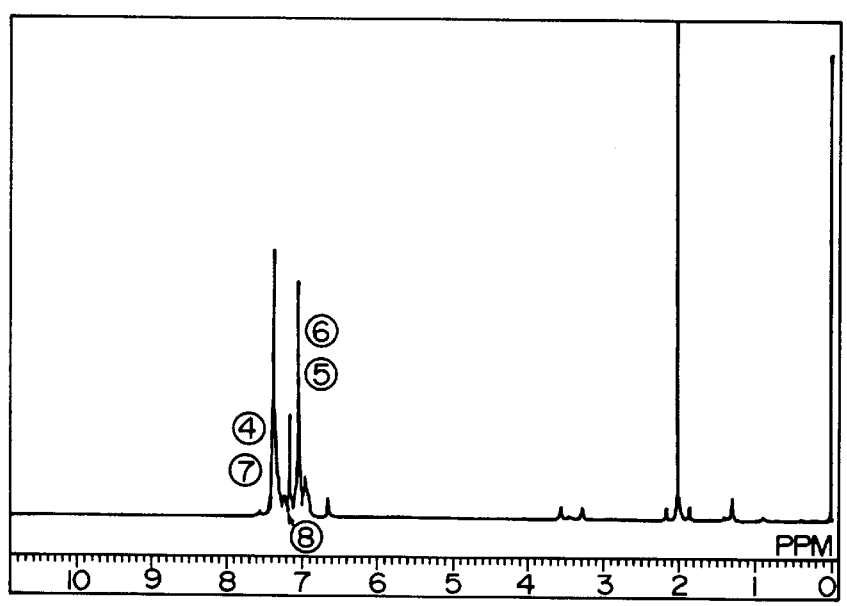
Figure 1B:
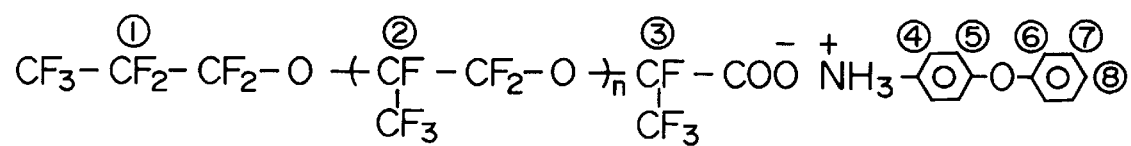

The structure of the fluorine-containing compound was investigated from the $^{19}$F-NMR spectrum of FIG. 1A and the $^1$H-NMR spectrum of FIG. 1B. In FIG. 1A, the spectrum of fluorine at the position ③ shifted toward the lower magnetic field side as compared with the spectrum at the position ①, revealing that no unreacted carboxylic acid remained (in the case of unreacted carboxylic acids, in contrast, the spectrum at the position ③ shifts toward the higher magnetic field side than the position ①). From the $^1$H-NMR spectrum of FIG. 1B, the presence of phenoxyphenol can be confirmed, while no spectrum of amide (in the vicinity of 9–13 $\mu$m) was observed. Thus, the structure of the formula 14 was identified. The compound has a characteristic feature of being soluble in methanol in spite of being a fluorine-containing compound of a high molecular weight; further it is soluble also in 10% aqueous methanol solution.

On the other hand, the fluorine-containing compound of the present invention was examined for its properties as a surface modifier. First, a substrate (I) was prepared which comprised an aluminum alloy substrate and an amorphous silicon film of 1 $\mu$m thickness formed thereon. The substrate (I) was dip-coated in a 0.2% by weight solution of the fluorine-containing compound of this Example in perfluorohexane under conditions of a dip time of 60 sec and draw-out velocity of 1 mm/sec. The dipped substrate was dried at room temperature for 1 hour. The surface tension of the surface thus coated was determined with water and a silicone oil (G747, mfd. by Shin-etsu Chemical Co.), respectively, for its hydrophobicity and oilphobicity. The results are shown in Table 1.

As a control, a substrate wherein no fluorine-containing compound of this Example was used, that is, the substrate (I) itself. The results revealed that when the fluorine-containing compound of the present Example was used as a surface treating agent, the treated surface showed larger contact angles for both water and silicone oil than the control. Thus, it was superior in hydrophobic property and oilphobic property.

TABLE 1

| | Contact angle (deg) | |
| --- | --- | --- |
| | Water | Silicone oil |
| Example 1 | 115 | 95 |
| Control (substrate [I]) | 26 | Not more than 10 |

EXAMPLE 2

In the same manner as in Example 1, about 18 g of a colorless, highly viscous fluorine-containing compound of the formula 15 was obtained from 15.4 g (0.008 mol) of Krytox 157FS-L (number average molecular weight: 1920) and 5 g of tribenzylamine. The compound had a viscosity of $736.5 \times 10^6$ m$^2$/s at 40° C.

Figure 2A:
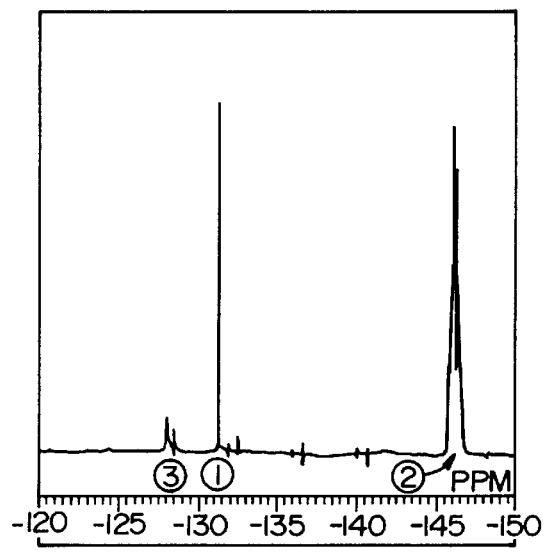
FIGS. 2A and 2B show NMR spectra of the fluorine-containing compound of Example 2 of the present invention, FIG. 2A referring to the $^{19}$F-NMR spectrum and FIG. 2B referring to the $^1$H-NMR system.
Figure 2B:
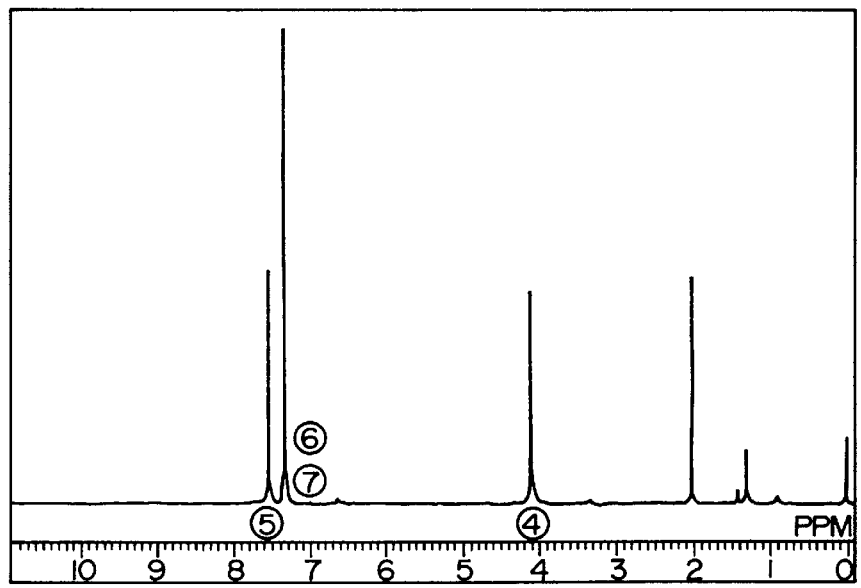
Figure 2B:
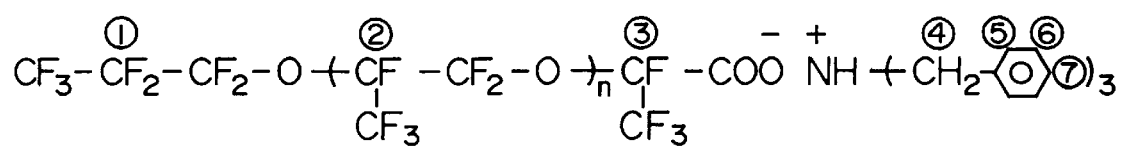

The structure of the fluorine-containing compound was investigated from the $^{19}$F-NMR spectrum of FIG. 2A and the $^1$H-NMR spectrum of FIG. 2B. In FIG. 2A, the spectrum of fluorine at the position ③ shifted toward the lower magnetic field side as compared with the spectrum at the position ①, revealing that no unreacted carboxylic acid remained (in the case of unreacted carboxylic acids, the spectrum at the position ③ shifts toward the higher magnetic field side than the position ①). From the $^1$H-NMR spectrum of FIG. 2B, the presence of tribenzyl groups could be confirmed, while no spectrum of amides (in the vicinity of 9–13 μm) was observed. Thus, the structure of the formula 15 was identified. This compound, similarly to that of Example 1, has a characteristic feature of being soluble in methanol.

The surface modification ability of this fluorine-containing compound was examined, in the similar manner as in Example 1, by determining whether it can exhibit an effect of imparting hydrophobicity and oilphobicity. The results are shown in Table 2.

As a control was used the substrate I itself as in Example 1. The results thus obtained revealed that when the fluorine-containing compound of the present Example was used, the treated surface showed larger contact angles for both water and oil than the control. Thus, it was superior in hydrophobic property and oilphobic property.

TABLE 2

| | Contact angle (deg) | |
| --- | --- | --- |
| | Water | Silicone oil |
| Example 2 | 110 | 90 |
| Control (substrate [I]) | 26 | Not more than 10 |

EXAMPLE 3

In the same manner as in Example 1, about 15 g of a colorless, transparent, highly viscous fluorine-containing compound of the formula 7 shown before was obtained from 15.4 g (0.008 mol) of Krytox 157 FS-1 (number average molecular weight: 1,920) and 1.0 g (0.0127 mol) of pyridine. The compound had a viscosity of $301.5 \times 10^6$ m$^2$/s at 40° C.

Figure 3A:
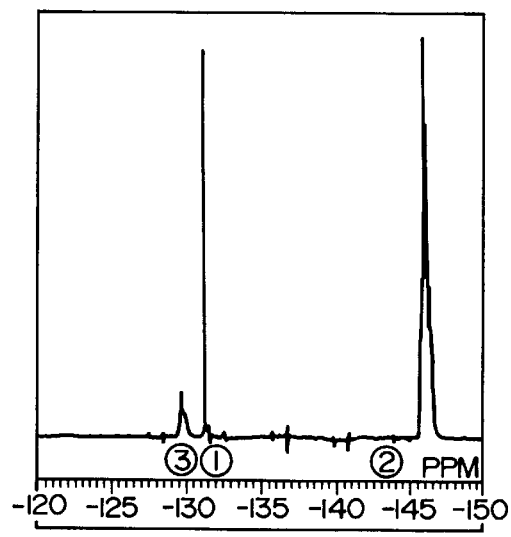
FIGS. 3A and 3B show NMR spectra of the fluorine containing compound of Example 3 of the present invention, FIG. 3A referring to the $^{19}$F-NMR spectrum and FIG. 3B referring to the $^1$H-NMR spectrum.
Figure 3B:
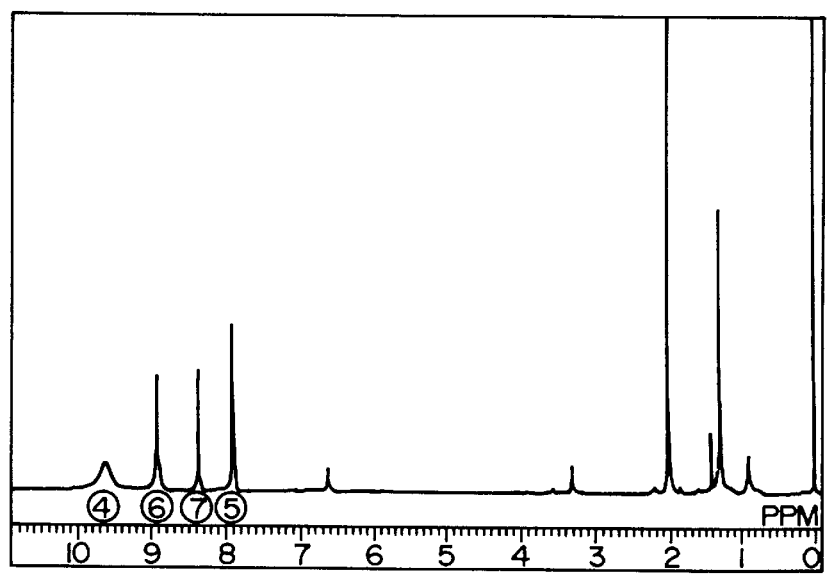
Figure 3B:
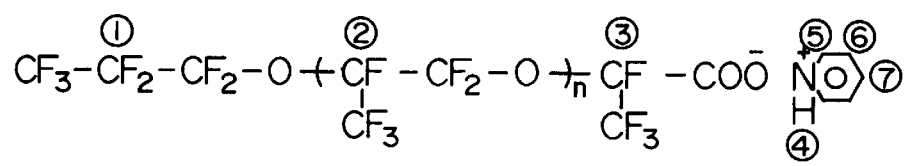

The structure of the fluorine-containing compound was investigated from the $^{19}$F-NMR spectrum of FIG. 3A and the $^1$H-NMR spectrum of FIG. 3B. In FIG. 3A, the spectrum of fluorine at the position ③ shifted toward the lower magnetic field side as compared with the spectrum at the position ①, revealing that no unreacted carboxylic acid remained (in the case of unreacted carboxylic acid, the spectrum at the position ③ shifts toward the higher magnetic field side than the position ①). Further, from the $^1$H-NMR spectrum of FIG. 3B the presence of pyridine groups could be confirmed. Thus, the structure of the formula 7 was identified. This compound, similarly to that of Example 1, has a characteristic feature of being soluble in methanol.

The surface modification ability of this fluorine-containing compound was examined, in the similar manner as in Example 1, by determining whether it can exhibit an effect of imparting hydrophobicity and oilphobicity. The results are shown in Table 3.

As a control was used the substrate [I] itself as in Example. The results thus obtained revealed that when the fluorine-containing compound of this invention was used, the treated surface showed larger contact angles for both water and silicone oil than the control. Thus, it was superior in hydrophobic property and oilphobic property.

TABLE 3

| | Contact angle (deg) | |
| --- | --- | --- |
| | Water | Silicone oil |
| Example 3 | 110 | 90 |
| Control (substrate [I]) | 26 | Not more than 10 |

EXAMPLE 4

In the same manner as in Example 1, about 15 g of a pale brown, transparent, highly viscous fluorine-containing compound represented by the formula 18 shown before was obtained from 15.4 g (0.008 mol) of Krytox 157 FS-L (number average molecular weight: 1,920) and 1.5 g (0.0116 mol) of isoquinoline. The compound had a viscosity of $365.2 \times 10^6$ m$^2$/s at 40° C.

Figure 4A:
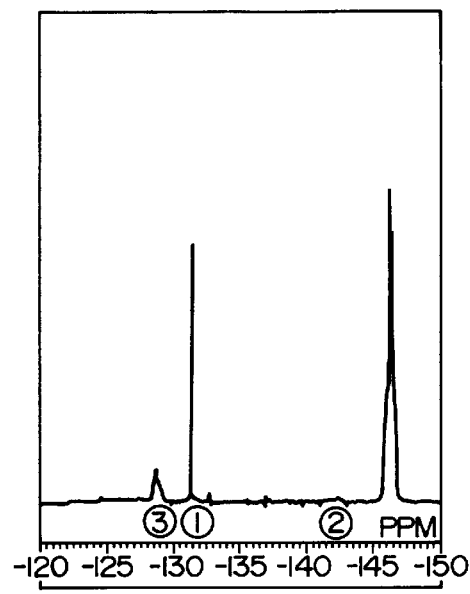
FIGS. 4A and 4B show NMR spectra of the fluorine-containing compound of Example 4 of the present invention, FIG. 4A referring to the $^{19}$F-NMR spectrum and FIG. 4B referring to the $^1$H-NMR spectrum.
Figure 4B:
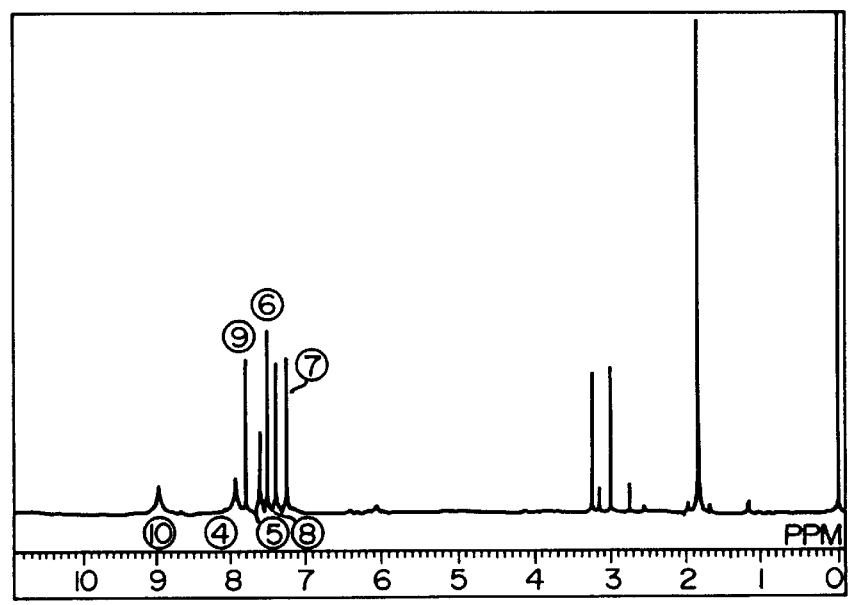
Figure 4B:
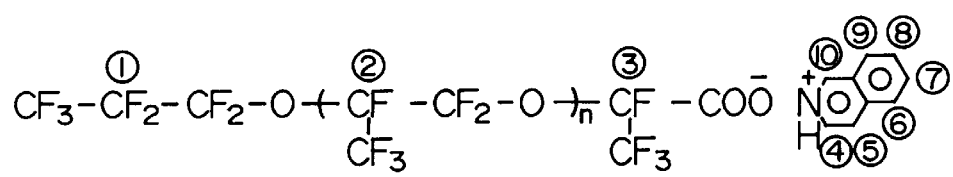

The structure of the fluorine-containing compound was investigated from the $^{19}$-NMR spectrum of FIG. 4A and the $^1$H-NMR spectrum of the FIG. 4B. In FIG. 4A, the spectrum of fluorine at the position ③ shifted toward the lower magnetic field side as compared with the spectrum at the position ①, revealing that no unreacted carboxylic acid remained (in the case of unreacted carboxylic acid, the spectrum at the position ③ shift toward the higher magnetic field side than the position ①). Further, from the $^1$H-NMR spectrum of FIG. 4B, the presence of the isoquinoline ring could be confirmed. Thus, the structure of the formula 18 was identified.

The surface modification ability of the fluorine-containing compound was examined, in the similar manner as in Example 1, by determining whether it can exhibit an effect of imparting hydrophobicity and oilphobicity. The results are shown in Table 4.

As a control was used the substrate [I] itself as in Example. The results thus obtained revealed that when the fluorine-containing compound of this invention was used, the treated surface showed larger contact angles for both water and silicone oil than the control. Thus, it was superior in hydrophobic property and oilphobic property.

TABLE 4

| | Contact angle (deg) | |
|---|---|---|
| | Water | Silicone oil |
| Example 4 | 110 | 90 |
| Control (substrate [I]) | 26 | Not more than 10 |

EXAMPLE 5

In the same manner as in Example 1, Krytox 257FS-L and Fomblin Z-DI were reacted with a variety of amines (I) shown in Table 5, including various anilines and various pyridines, quinolines and acridine having a heterocyclic ring, some of the amines having benzyl. In the reaction, the amines were reacted in excess of about 1.5 moles relative to 1 mole of the carboxylic acid of Krytox or Fomblin. The structure as well as the viscosity, hydrophobicity and oilphobicity of the products are shown in Table 5.

As a control was used the substrate (I) itself as in Example. The results thus obtained revealed that when the surface treating agents of this invention were used, the treated surfaces all showed larger contact angles for both water and silicone oil than the control. Thus, they were superior in hydrophobic property and oilphobic property.

TABLE 5

| Compound No. | Amine (I) | Structure of product | Viscosity, 40° C. ($\times 10^6$ m$^2$/s) | Contact angle (deg) Water | Contact angle (deg) Silicone oil |
|---|---|---|---|---|---|
| 1 | Aniline | Formula 3 | 335 | 112 | 90 |
| 2 | 2-Methoxy-4-nitroaniline | Formula 4 | 260 | 110 | 86 |
| 3 | Benzylamine | Formula 5 | 283 | 110 | 92 |
| 4 | Benzylaniline | Formula 6 | 210 | 105 | 85 |
| 5 | Pyridine | Formula 7 | 302 | 110 | 90 |
| 6 | Quinoline | Formula 8 | 350 | 100 | 82 |
| 7 | Acridine | Formula 9 | Wax-like | 98 | 80 |
| 8 | 3-Chloro-5-hydroxy-pyridine | Formula 10 | 410 | 110 | 91 |
| 9 | 2-Methoxy-pyridine | Formula 11 | 280 | 112 | 89 |
| 10 | 6-Nitro-quinoline | Formula 12 | 385 | 103 | 82 |
| 11 | 2,6-Dimethyl-quinoline | Formula 13 | 258 | 105 | 83 |
| 12 | Pyridine | Formula 16 | 102 | 108 | 85 |
| 14 | 2,4-Dichloro-benzylamine | Formula 17 | 420 | 110 | 91 |
| | Control (substrate [I]) | | | 26 | Not more than 10 |

EXAMPLE 6

Disks having a magnetic layer were prepared by providing on the surface of an Al alloy disk of 5.25 inch diameter a Ni—P layer and further thereon a Co layer, then sputtering thereon a Ni-Co magnetic layer in 50 nm thickness and further forming a carbon film in 50 nm thickness thereon. Then, the fluorine-containing surfactants obtained in Examples 1, 2 and 5 were respectively dissolved in perfluorohexane to a concentration of 0.2% by weight to prepare solutions. The disk prepared above was dipped in the solution to be coated with the surface modifier in a film thickness of 10±2 nm. The dip time was 60 sec. and the draw-up velocity was 1 mm/sec.

The adsorbability of these surface modifiers to carbon film was evaluated by their thermal weight loss. That is, the disk having the modifier film was heated at 100° C. and the percentage of film thickness decrease caused by heating was determined. The adsorbability was evaluated from the film thickness after 100 hours of heating. Separately, the sliding property as an actual disk was evaluated by CSS method (contact-start-stop test method). The test machine used was the one made by Onoda Cement Co., Ltd. The test conditions were as follows: (1) number of rotation: 3,600 ppm, (2) 1 cycle: 30 sec., (3) number of final cycle: 1,000 cycle, and (4) head load: 10 g. The sliding property was evaluated by the frictional force at the time of stiction in the final cycle.

For Comparative Examples, there were used an ammonium carboxylate having neither aromatic ring nor heterocyclic ring ($C_8F_{17}COONH_4$), a perfluoropolyether which has a heterocycle at the terminal and a high adsorbability (AM 2001, mfd. by Monte Fluos Corp.), a coating type lubricant for disks (Krytox 143 AB), an ammonium carboxylate which has an aromatic ring but has a perfluoroalkyl chain of short fluorocarbon chain

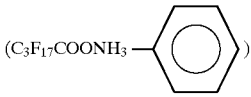

and an ammonium carboxylate which contains stearylamino and has a long fluoropolyoxyalkyl chain ($F(CF(CF_3)CF_2O)_n$—$CF(CF_3)COO^-N^+H_3$—$C_{18}H_{37}$). These compounds were evaluated after coated in a film thickness of 5–10 nm on the above-mentioned disk having a carbon film used as a substrate. The evaluation was made by the thermal weight loss and by the frictional force at the time of stiction in the final cycle of the CSS test.

The results thus obtained are shown in Table 6. Table 6 reveals that the fluorine-containing surface modifiers of the present invention show a lower thermal weight loss and hence a higher adsorbability and also have a better CSS characteristic than those used in Comparative Examples.

The molecular structures of AM 2001 and Krytox 143 AB are, respectively, as follows. AM 2001:

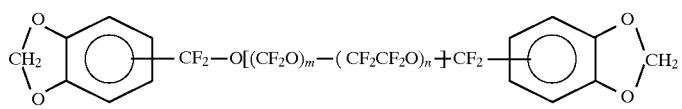

(m+n=25, m/n=0.6, number average molecular weight: 2100)

Krytox 143 AB:

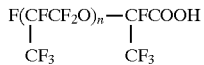

(n=average 27, number average molecular weight: 4700)

TABLE 6

| Compound | Thermal weight loss (%) 100° C.-100 hr | CSS evaluation (%) |
|---|---|---|
| Compound of Example 1 | 12 | 6 |
| Compound of Example 2 | 15 | 7 |
| Example 5 | | |
| Compound No. 1 | 15 | 8 |
| Compound No. 2 | 13 | 6 |
| Compound No. 3 | 13 | 6 |
| Compound No. 4 | 15 | 7 |
| Compound No. 5 | 12 | 7 |
| Compound No. 6 | 10 | 5 |
| Compound No. 7 | 11 | 5 |
| Compound No. 8 | 13 | 8 |
| Compound No. 9 | 12 | 8 |
| Compound No. 10 | 10 | 5 |
| Compound No. 11 | 10 | 5 |
| Compound No. 12 | 10 | 5 |
| Comparative Example | | |
| $C_2F_{17}COONH_4$ | Not less than 95 | Not less than 15 |
| AM2001 | 25 | 10 |
| Krytox 143 AB | 40 | 12 |
| $C_7F_{15}COO^-N^+H_3$—⬡ | Not less than 95 | Not less than 15 |
| $F(CFCF_2O)_n$—$CFOO^-N^+H_3$—$C_{18}H_{37}$ (with $CF_3$, $CF_3$) | 43 | Not less than 15 |

EXAMPLE 7

Disks having a magnetic layer were prepared by providing on the surface of an Al alloy disk of 5.25 inch diameter a Ni—P layer and further thereon a Co layer, then sputtering thereon a Ni—Co magnetic layer in 50 nm thickness and further forming a $SiO_2$ film in 50 nm thickness thereon. Then, the compound No. 6 of Example 5 was dissolved in perfluorohexane to a concentration of 0.2% by weight, and the disk prepared above was dipped in the solution to be coated with the surface modifier in a film thickness of 10±2 nm. The dip time was 60 sec. and the draw-up velocity was 1.5 mm/sec. The surface tension of the surface of the film thus formed was determined with water and a silicone oil (G747, mfd. by Shin-etsu Chemical Co.) for its hydrophobicity and oilphobicity. The results obtained are shown in Table 7.

As a control was used for evaluation an ammonium carboxylate having neither an aromatic ring nor a heterocycle ($C_8H_{17}COONH_4$).

The results reveal, as shown in Table 7, that the fluorine-containing surface modifier of the present invention shows a larger contact angle than the control compound. Thus, it has an excellent hydrophobic property.

TABLE 7

| | Contact angle (deg) | |
|---|---|---|
| | Water | Silicone oil |
| Example 7 | 100 | 85 |
| Control | Not more than 20 | 75 |

EXAMPLE 8

In the same manner as in Example 1, a disk (I) having an amorphous silicon film formed thereon was prepared. Then, a coating solution of 0.1% by weight concentration was prepared by dissolving the compound No. 5 of Example 5 in 10% aqueous methanol solution. The disk prepared above was dipped in the solution to be coated with the surface modifier in a film thickness of 10±2 mm. The dip time was 60 sec, and the draw-up velocity was 1 mm/sec. The surface tension of the surface of the film thus formed was determined with water and an silicone oil (G747, mfd. by Shin-etsu Chemical Co.) for the hydrophobicity and oilphobicity of the surface. The results obtained are shown in Table 8.

As a control was used the substrate (I) itself as in Examples 1 and 2. The results reveal that when the surface treating agent of the present invention is used, the treated surface shows larger contact angles for both water and silicone oil. Thus, it shows higher hydrophobic property and oilphobic property than the control.

TABLE 8

| | Contact angle (deg) | |
|---|---|---|
| | Water | Silicone oil |
| Example 8 | 120 | 93 |
| Control (substrate [I]) | 26 | Not more than 10 |

EXAMPLE 9

A disk having a magnetic layer was prepared by providing on the surface of an Al alloy disk of 5.25 inch diameter a Ni—P layer and further thereon a Co layer, then sputtering thereon a Ni—Co magnetic layer in 50 nm thickness, and further forming a carbon film in 50 nm thickness thereon. Then, the fluorine-containing surfactant obtained in Example 1 was dissolved in perfluorohexane to a concentration of 0.15, 0.2, 0.25 and 0.3% by weight, respectively, to prepare solutions. The disk prepared above was dipped in each of the solutions to be coated with the modifier under dipping conditions of a dip time of 60 sec, and draw-up velocity of 1 mm/sec.

The magnetic recording media thus obtained had a film thickness of surface modifier of 6.8, 10.2, 15.5 and 32.5 nm, respectively. The relation between the film thickness and the sliding property was examined by the CSS method (contact-start-stop test method) with a testing apparatus made by Onoda Cement Co., Ltd. The test conditions were as follows: (1) number of rotation: 3,600 rpm, (2) 1 cycle: 30 sec., (3) number of final cycle: 1,000, (4) head load: 10 g. The sliding property was evaluated by determining the frictional force at the time of stiction in the initial and the final cycle. The results obtained are shown in Table 9. In the test, when the film thickness was 32.5 nm, the tangential force was as large as 30 g or more and the CSS characteristic could not be evaluated. It has been revealed, therefore, that the film thickness of the surface modifier, as used in magnetic recording media, must be not more than 30 nm, at least.

As a film thickness of 30 nm or less, an excellent CSS characteristic was exhibited.

TABLE 9

| Coating solution concentration | Film thick-ness | CSS characteristic (frictional force at stiction (g)) | |
|---|---|---|---|
| (wt. %) | (nm) | Initial | After 1,000 cycles |
| 0.15 | 6.8 | 1.7 | 8 |
| 0.20 | 10.2 | 2.3 | 6 |
| 0.25 | 15.5 | 4.5 | 7 |
| 0.3 | 32.5 | >30 | Unmeasurable |

EXAMPLE 10

In 150 g of trifluorotrichloroethane was dissolved 37 g (0.01 mol) of Demnam SH-2 (mfd. by DAIKIN INDUSTRIES, LTD., number average molecular weight: 3700) represented by the formula,

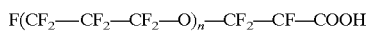

$F(CF_2—CF_2—CF_2—O)_n—CF_2—CF—COOH$ wherein n is average 21, and stirred thoroughly. To the solution was added dropwise a solution of 2.3 g of 4,4'-bipyridyl (molecular weight: 156) in 10 g of methanol, and thorough stirring was continued at room temperature for 1 hour.

After the reaction, trifluorotrichloroethane and methanol were removed by means of an evaporator to obtain about 39 g of a pale brown grease-like substance. The substance was dissolved in 300 g of perfluorohexane to obtain a solution [I].

Then, the solution [I] and 100 g of methanol were placed in a separatory funnel for 500 ml, then thoroughly stirred and allowed to stand for 5 hours. On standing, the solution in the separatory funnel separated into two layers, the upper layer being a methanol solution layer and the lower layer a perfluorohexane solution layer. The solution [II] of the lower layer was withdrawn, and perfluorohexane was removed from the solution by means of an evaporator to obtain a fluorine-containing compound, compound No. 19, of the following structure,

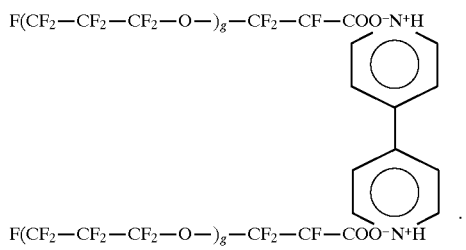

The fluorine-containing compound of the present invention was examined for its property as a surface modifier. A substrate [I] was prepared by forming an amorphous silicon film of 1 μm thickness on an aluminum alloy substrate, and dip-coated with a 0.2% by weight solution of the compound No. 13 in perfluorohexane solvent under coating conditions of a dip time of 60 sec, and draw-up velocity of 1 mm/sec. The surface tension of the surface of the film thus formed was determined with water and a silicone oil (G 747, mfd. by Shin-etsu Chemical Co.) for its hydrophobicity and oilphobicity. The results are shown in Table 10.

As a control was used a substrate wherein the fluorine-containing compound used in this Example was not used, namely the substrate [I] itself. The results revealed that when the fluorine containing compound of the present invention was used as the surface treating agent, the treated surface showed larger contact angles for both water and oil than the control. Thus, it shows high hydrophobic property and oilphobic property.

TABLE 10

| | Contact angle (deg) | |
|---|---|---|
| | Water | Silicone oil |
| Example 10 | 118 | 95 |
| Control (substrate [I]) | 26 | Not more than 10 |

EXAMPLE 11

In the same manner as in Example 10, 37 g (0.01 mol) of Demnam SH-2 (number average molecular weight: 3,700) is dissolved in 150 g of trifluorotri-chloroethane and stirred thoroughly. To the solution was added dropwise a solution of 1.2 g of 1,4-diazine (molecular weight: 80) in 10 g of methanol, and thorough stirring was continued at room temperature for 1 hour. After the reaction, the reaction mixture was subjected to extracting operation in the same manner as in Example 10 to obtain compound No. 20 of the following structure,

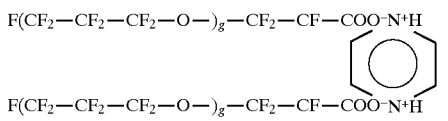

The fluorine-containing compound of the present invention obtained above was examined for its property as a surface modifier in the same manner as in Example 10. The results are shown in Table 11.

The results revealed that when the fluorine-containing compound of the present invention was used as the surface treating agent, the treated surface shows larger contact angles for both water and oil than the control. Thus, it shows high hydrophobic property and oilphobic property.

TABLE 11

| | Contact angle (deg) | |
|---|---|---|
| | Water | Silicone oil |
| Example 11 | 110 | 95 |
| Control (substrate [I]) | 26 | Not more than 10 |

EXAMPLE 12

In the same manner as in Example 10, Demnam SH-2 was reacted with various amines and various pyridines, quinolines and acridine having a heterocyclic ring and the derivatives thereof (II) shown in Table 12. The adsorbability of the reaction products to carbon film was evaluated in terms of thermal weight loss in the same manner as in Example 6; that is, the percentage of film thickness decrease caused by heating was determined. The film thickness after heating at 100° C. for 100 hours was used for evaluation. Separately, the sliding property of the reaction product as used in actual disks was evaluated in the same manner as in Example 6 by the CSS method (contact-start-stop test method) using a test machine mfd. by Onoda Cement Co., Ltd.

Control compounds used for Comparative Example were also evaluated in the same manner as in Example 6.

The results thus obtained revealed, as shown in Table 12, that the fluorine-containing surface modifiers of the present invention showed lower evaluation weight loss and hence higher adsorbability and also were better in CSS characteristic than the compounds of comparative Example.

TABLE 12

| Compound No. | Amine (II) | Product No. | Thermal weight less (%) 100° C.-100 hr | CSS evaluation (g) |
|---|---|---|---|---|
| 1 | Aniline | Formula 21 | 8 | 5 |
| 2 | Benzylamine | Formula 22 | 8 | 5 |
| 3 | Benzylaniline | Formula 23 | 6 | 4 |
| 4 | Pyridine | Formula 24 | 8 | 3 |
| 5 | Quinoline | Formula 25 | 6 | 2 |
| 6 | Acridine | Formula 26 | 5 | 2 |
| 7 | 2-Chloro-5-hydroxypyridine | Formula 27 | 7 | 4 |
| 8 | 2-Methoxypyridine | Formula 28 | 7 | 4 |
| 9 | 6-Nitroquinoline | Formula 29 | 6 | 2 |
| 10 | 2,6-Dimethylquinoline | Formula 30 | 5 | 2 |
| 11 | 4-Phenoxyaniline | Formula 31 | 4 | 2 |
| 12 | Tribenzylamine | Formula 32 | 8 | 3 |
| 13 | 1,5-Naphthyridine | Formula 33 | 10 | 5 |
| 14 | 4,4'-Bipyridyl | Formula 34 | 5 | 2 |
| 15 | Di-2-pyridyl ketone | Formula 35 | 5 | 2 |
| 16 | 4,4'-Dihydromethyl-2,2-bipyridyl | Formula 36 | 6 | 3 |
| Comparative Example | $C_8F_{17}COO^-N^+H_4$ | | Not less than 95 | Not less than 15 |
| | AM2001 | | 25 | 10 |
| | Krytox 143 AB | | 40 | 12 |
| | $C_7F_{15}COO^-N^+H_3$—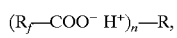 | | Not less than 95 | Not less than 15 |
| | $F(CF(CF_3)CF_2O)_n\text{-}CF(CF_3)COO^-N^+H_3-C_{18}H_{37}$ | | 43 | Not less than 15 |

As set forth above, the compounds of the present invention are, as a fluorine-containing surface modifier, excellent in adhesiveness to carbon and moreover excellent in lubricity, hydrophobic property and oilphobic property. By using the compounds, therefore, the sliding durability of magnetic recording media is improved and thus magnetic recording media having high reliability and high recording density can be obtained.

What is claimed is:

1. A solid surface modifier which comprises
   (i) an ammonium carboxylate fluorine-containing compound having the formula, $(R_f\text{—COO}^-\ H^+)_n\text{—R}$, wherein $R_f$ is a perfluoropolyoxyalkyl chain having a number average molecular weight of at least 800, n is a number of 1–2, and R is a residue selected from the group consisting of an aromatic ammonium which may have one or more substituents at the nucleus, and an aromatic inium which may have one or more substituents at the nucleus, said substituents being selected from the group consisting of $C_{1-18}$ alkyl, hydroxy, methoxy, nitro, cyano, halogeno, benzyl, phenoxy —COOH, —COOCH$_3$ and —CH$_2$OH, and
   (ii) at least one solvent selected from the group consisting of alcohols and fluorine-containing solvents.

2. The modifier of claim 1, wherein $R_f$ is a perfluoropolyoxyalkyl chain having a number average molecular weight of from 800 inclusive to 10,000 inclusive.

3. The modifier of claim 1, wherein $R_f$ has a repeating unit,

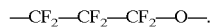

4. The modifier of claim 1, wherein R is a residue selected from the group consisting of phenylammonium, diphenylammonium, triphenylammonium, benzylammonium, dibenzylammonium, tribenzylammonium, pyridinium, quinolinium, isoquinolinium, acridinium, naphthyridinium, bipyridinium and bipyridinium bridged by —CO— and one of the said groups having at the aromatic nucleus one or two substituents selected from the group consisting of methoxy, $C_1$–$C_{18}$ alkyl, halogeno, nitro, benzyl and phenoxy, provided that when the aromatic nucleus is substituted with two substituents, the substituents may be the same or different.

5. The modifier of claim 1, wherein R is a residue selected from the group consisting of phenylammonium and benzylammonium and one of the said groups having at the aromatic nucleus one or two substituents selected from the group consisting of methoxy, $C_{1-18}$ alkyl, halogeno, nitro, benzyl and phenoxy, provided that when the aromatic nucleus is substituted with two substituents, the substituents may be the same or different.

6. The modifier of claim 1, wherein R is a residue selected from the group consisting of pyridinium, quinolinium and acridinium and one of the said groups having at the aromatic nucleus one or two substituents selected from the group consisting of methoxy, $C_1$–$C_{18}$ alkyl, halogeno, nitro, benzyl and phenoxy, provided that when the aromatic nucleus is substituted with two substituents, the substituents may be the same or different.

7. A solid surface modifier which comprises (i) an ammonium carboxylate fluorine-containing compound having the formula, $$(R_f\text{—COO}^-\text{H}^+)_n\text{—R},$$

wherein $R_f$ is a perfluoropolyoxyalkyl chain having a number average molecular weight of at least 800, n is a number of 1–2, and R is a residue selected from the group consisting of an aromatic ammonium which may have one or more substituents at the nucleus, and an aromatic inium which may have one or more substituents at the nucleus, substituents being selected from the group consisting of $C_1$–$C_{18}$ alkyl, hydroxy, methoxy, nitro, cyano, halogeno, benzyl, phenoxy, —COOH, —COOCH$_3$ and —CH$_2$OH, and (ii) at least one alcohol, and (iii) water.

* * * * *